(12) United States Patent
Edelmann et al.

(10) Patent No.: US 8,119,730 B2
(45) Date of Patent: Feb. 21, 2012

(54) SILANE FORMULATION WITH HIGH FILLER CONTENT

(75) Inventors: Roland Edelmann, Rheinfelden (DE); Björn Borup, Rheinfelden (DE); Christian Wassmer, Wembach (DE); Jaroslaw Monkiewicz, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 1307 days.

(21) Appl. No.: 10/563,022

(22) PCT Filed: May 14, 2004

(86) PCT No.: PCT/EP2004/050812
§ 371 (c)(1),
(2), (4) Date: Nov. 21, 2006

(87) PCT Pub. No.: WO2005/003218
PCT Pub. Date: Jan. 13, 2005

(65) Prior Publication Data
US 2007/0110906 A1    May 17, 2007

(30) Foreign Application Priority Data
Jul. 3, 2003 (DE) .................... 103 30 020

(51) Int. Cl.
*C08L 83/00* (2006.01)
(52) U.S. Cl. ............. 524/588; 524/493; 523/204
(58) Field of Classification Search ............ 524/522, 524/493, 588; 106/287.16; 528/10–31; 523/204
See application file for complete search history.

(56) References Cited

U.S. PATENT DOCUMENTS

| | | | |
|---|---|---|---|
| 4,329,273 A * | 5/1982 | Hardman et al. ........ 524/862 |
| 5,021,091 A * | 6/1991 | Takarada et al. ....... 106/287.16 |
| 5,164,501 A | 11/1992 | Deschler et al. |
| 5,591,818 A | 1/1997 | Standke et al. |
| 5,629,400 A | 5/1997 | Standke et al. |
| 5,679,147 A | 10/1997 | Standke et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 6,054,601 A | 4/2000 | Standke et al. |
| 6,054,651 A | 4/2000 | Fogel et al. |
| 6,133,466 A | 10/2000 | Edelmann et al. |
| 6,176,918 B1 | 1/2001 | Glausch et al. |
| 6,177,582 B1 | 1/2001 | Jenkner et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |
| 6,395,858 B1 | 5/2002 | Mack et al. |
| 6,403,228 B1 | 6/2002 | Mack et al. |
| 6,491,838 B1 | 12/2002 | Standke et al. |
| 6,500,883 B1 | 12/2002 | Mack et al. |
| 6,534,667 B1 | 3/2003 | Standke et al. |
| 6,641,870 B2 | 11/2003 | Bartkowiak et al. |
| 6,689,468 B2 | 2/2004 | Edelmann et al. |
| 6,695,904 B2 * | 2/2004 | Burger et al. ........... 106/287.14 |
| 6,699,586 B2 * | 3/2004 | Edelmann et al. ........... 428/447 |
| 6,713,186 B1 | 3/2004 | Jenkner et al. |
| 6,727,375 B2 | 4/2004 | Steding et al. |
| 6,770,327 B2 | 8/2004 | Edelmann et al. |
| 6,830,816 B2 * | 12/2004 | Mehnert et al. ........... 428/423.1 |
| 6,946,537 B2 | 9/2005 | Krafczyk et al. |
| 2002/0098243 A1 * | 7/2002 | Edelmann et al. ........... 424/497 |
| 2002/0127415 A1 | 9/2002 | Standke et al. |
| 2002/0197475 A1 * | 12/2002 | Edelmann et al. ........... 428/405 |
| 2003/0008974 A1 * | 1/2003 | Mehnert et al. ............. 525/100 |
| 2003/0018155 A1 | 1/2003 | Krafczyk et al. |
| 2003/0041779 A1 * | 3/2003 | Burger et al. ........... 106/287.14 |
| 2003/0050419 A1 | 3/2003 | Sanders et al. |
| 2003/0181566 A1 * | 9/2003 | Chapman et al. ............. 524/492 |
| 2003/0186066 A1 | 10/2003 | Monkiewicz et al. |
| 2006/0063002 A1 | 3/2006 | Edelmann et al. |

FOREIGN PATENT DOCUMENTS
WO      00/02734      1/2000

OTHER PUBLICATIONS

U.S. Appl. No. 08/124,955, filed Sep. 21, 1993, Standke, et al.
U.S. Appl. No. 10/576,467, filed Apr. 20, 2006, Edelmann, et al.
U.S. Appl. No. 11/572,555, filed Jan. 23, 2007, Just, et al.
U.S. Appl. No. 11,572,688, filed Jan. 25, 2007, Edelmann, et al.
U.S. Appl. No. 11/572,691, filed Jan. 25, 2007, Edelmann, et al.
U.S. Appl. No. 11/258,025, filed Oct. 26, 2005, Edelmann, et al.
U.S. Appl. No. 10/112,045, filed Apr. 1, 2002, Mehnert, et al.
U.S. Appl. No. 11/576,504, filed Apr. 2, 2007, Mueh, et al.

* cited by examiner

Primary Examiner — Alicia Toscano
(74) Attorney, Agent, or Firm — Oblon, Spivak, McClelland, Maier & Neustadt, L.L.P.

(57) ABSTRACT

A formulation containing: (i) at least one organoalkoxysilane and/or at least one organoalkoxysiloxane; (ii) at least one inorganic oxidic powder; and (iii), optionally, an organic or inorganic acid is provided. The formulation contains from 5 to 50% of the inorganic oxide powder and has a viscosity of less than 1500 mPa·s. A weight ratio of the organoalkoxysilane and/or at least one organoalkoxysiloxane to the inorganic oxidic powder is from 19:1 to 1:1.

23 Claims, No Drawings

SILANE FORMULATION WITH HIGH FILLER CONTENT

The present invention relates to a new formulation comprising organoalkoxysilane and a high proportion of inorganic oxidic powders, to its preparation, and to its use.

In numerous chemical products, inorganic oxidic powders are used as pigments in coloring function and also as fillers. Examples thereof include pyrogenically prepared silica or corresponding titanium dioxide or aluminum oxide, precipitated aluminum oxides or oxide hydroxides or hydroxides, precipitated silica, iron oxide, zirconium oxide, and other metal oxides. Said powers are used, for example, in the production of plastics and in paints and inks. A concern here is that the powder particles should be distributed in the product as homogeneously as possible. Silanes as well are frequently used in the production of such products. Powders whose surface has been modified with a silane are also employed. Furthermore, the uniformity of particle distribution may have a substantial effect on a particularly good product quality. The incorporation of powder fractions into a composition is generally difficult and intensive in terms of apparatus, particularly when the particles are very fine.

It is an object of the present invention to provide a further means of incorporating inorganic oxidic powders having a size down into the nanometer range into alkoxysilanes.

This object is achieved in accordance with the invention as specified in the claims.

Surprisingly it has been found that nanoscale inorganic oxidic powders, in particular in relatively large amounts, examples including both hydrophilic and hydrophobic pyrogenic silica, pyrogenic aluminum oxide, boehmite, and titanium dioxide, can be incorporated homogeneously, simply and economically, and also with comparative advantage into organoalkoxysilanes of the general formula I and/or organoalkoxysilanes of the general formula II by means of an intensive dispersing operation involving the addition of less than 0.8 mol, preferably less than 0.5 mol, of water per mol of silicon in the silane and/or siloxane used, the viscosity of the system of the invention falling considerably as compared with that of a formulation for which the powder is merely stirred into the silane and/or siloxane. In the preparation of the system of the invention it is also possible to add a catalytic amount of organic or inorganic acid and also a wetting assistant. A further reduction in the viscosity of the system of the invention can be achieved if the system is treated with ultrasound actually during its preparation or subsequently.

Systems obtained in this way are generally clear, transparent to opalescent, readily pourable liquids having a comparatively low viscosity and a hitherto unknown, extremely high solids content.

Furthermore, formulations of the invention advantageously can be diluted as desired with an organic solvent or solvent mixtures, e.g., alcohols or esters.

In addition, systems of the invention are substantially storage-stable liquids having a storage stability of in general from 6 to 12 months at room temperature.

Present systems of the invention are referred to below, inter alia, as highly filled silane formulations or just silane formulation, or formulation.

Silane formulations of the invention can be used advantageously as what are termed liquid powders, especially where organosilanes and/or organosiloxanes can also be added.

Highly filled silane formulations of the invention can be used simply and advantageously, in particular, for application in downstream products, examples being liquid systems of other kinds, such as solutions, mixtures or melts; in this context, as compared with the incorporation of powders into a liquid system of another kind, the system of the invention can be incorporated with comparatively little effort, speedily, and with particular homogeneity.

The use of silane formulations of the invention is also particularly advantageous on account of the fact that the silane, which acts as solvent, still contains a sufficient number of hydrolyzable alkoxy groups, which after further hydrolysis can participate in condensation reactions with silanes or with organic OH-functional components, the organic oxidic particles being incorporated into the network as it forms.

The present invention accordingly provides a formulation comprising (i) at least one organoalkoxysilane and/or at least one organoalkoxysiloxane and (ii) at least one inorganic oxidic powder, and (iii), if desired, an organic or inorganic acid, with component (ii) making up from 5 to 50% by weight, preferably from 10 to 35% by weight, more preferably from 15 to 32% by weight, and very preferably from 20 to 30% by weight of the formulation, and the formulation having a viscosity of less than 1500 mPa·s, preferably from 10 to 800 mPa·s, with particular preference from 50 to 500 mPa·s, and with very particular preference from 100 to 450 mPa·s.

A formulation of the invention may comprise a wetting assistant as further component (iv). Wetting assistants which can be used include conventional surface-active substances, especially nonylphenol polyglycol ethers, examples being those from the series of Marlophen® products from Sasol.

The formulation of the invention may further comprise as component (v) a diluent or solvent, such as alcohol, suitably methanol or ethanol, and also, where appropriate, water.

A formulation of the invention preferably comprises as component (i) at least one organoalkoxysilane of the general formula (I)

$$R_a-Si(OR^1)_{4-a} \quad (I),$$

in which groups R are identical or different and R is a linear, cyclic, branched or optionally substituted alkyl group having 1 to 18 carbon atoms, preferably methyl, n-propyl or octyl, or an alkenyl group having 2 to 8 carbon atoms, preferably vinyl, or an aryl group, preferably phenyl, or an acryloyl- or methacryloyloxyalkyl group, preferably 3-methacryloyloxypropyl, or a glycidyloxyalkyl group, such as a 3-glycidyloxypropyl group, or a fluoroalkyl group, with partial fluorination or perfluorination, for example, such as a tridecafluoro-1,1,2,2-tetrahydrooctyl group, or an aminoalkyl group, such as a 3-aminopropyl-, N-n-butyl-3-aminopropyl or N-(2-aminoethyl)-3-aminopropyl group, or a corresponding monosilylated or oligosilylated aminoalkyl group, or an alkoxy group having 1 to 6 carbon atoms, such as methoxy, ethoxy, propoxy or 2-methoxyethoxy, or a ureidoalkyl group or an epoxyalkyl group or a mercaptoalkyl group having 1 to 6 carbon atoms in the alkyl group, such as 3-mercaptopropyl, or a silylated alkylsulfanealkyl group, as in bis[3-(triethoxysilyl)propyl]tetrasulfane or a thiocyanatoalkyl group or an isocyanatoalkyl group, $R^1$ is a linear, cyclic or branched alkyl group having 1 to 6 carbon atoms, preferably a methyl, ethyl or n-propyl or isopropyl group, and a is 0 or 1 or 2, and/or at least one organoalkoxysiloxane of the general formula (II)

 (II)

in which groups $R^2$ are identical or different and $R^2$ is a linear, cyclic, branched or substituted alkyl group having 1 to 18 carbon atoms, an alkenyl group having 2 to 8 carbon atoms, an aryl group, an acryloyl- or methacryloyloxyalkyl group, a glycidyloxyalkyl group, an epoxyalkyl group, a fluoroalkyl group, an aminoalkyl group, a silylated aminoalkyl group, a ureidoalkyl group, a mercaptoalkyl group having 1 to 6 carbon atoms in the alkyl group, a silylated alkylsulfane group, a thiocyanatoalkyl group, an isocyanatoalkyl group or an alkoxy group having 1 to 6 carbon atoms, $R^3$ is a linear, cyclic, branched or substituted alkyl group having 1 to 18 carbon atoms, $R^4$ is a linear, cyclic or branched alkyl group having 1 to 6 carbon atoms, x is 0 or 1 or 2, and y is 0 or 1 or 2, with the proviso that (x+y)<3.

Furthermore, formulations of the invention preferably comprise at least one nanoscale powder (ii) having an average particle size ($d_{50}$) of less than 1200 nm, preferably from 50 to 1000 nm, more preferably from 100 to 900 nm, very preferably from 200 to 800 nm, such a powder being selected preferably from the group consisting of silicon oxide, such as Aerosil®, aluminum oxide, such as Aluminum oxide C, and titanium oxide. The fineness of grind, as determinable by means of a grindometer to DIN EN ISO 1524, is generally <10 μm. The particle size distribution can be determined by laser diffraction.

In addition, a formulation of the invention may comprise as further components at least one reaction product of components (i) and (ii), in which case, in accordance with a model concept, component (i) or, where appropriate, a partially hydrolyzed component (i) may react with a reactive center on the surface of the powder (ii), a hydroxyl group for example, with elimination of an alcohol molecule or a molecule of water.

Formulations of the invention may advantageously possess a solids content in accordance with DIN/ISO 3251 "Determination of the nonvolatile fraction of varnishes, paints and binders for varnishes and paints" (appropriately 1 hour at 125° C. in a drying cabinet) of up to 90% by weight, preferably up to 80% by weight, very preferably up to 60% by weight, based on the formulation, whose respective components total a maximum of 100% by weight.

The present invention further provides a process for preparing a formulation which is of low viscosity despite a high solids content, which process comprises combining components (i), (ii), and, where appropriate, (iv), adding from 0.001 to <0.8 mol of water per mole of Si in component (i), preferably from 0.05 to 0.5 mol of water, more preferably from 0.1 to 0.4 mol of water, very preferably from 0.2 to 0.35 mol of water, together where appropriate with a catalytic amount of an organic or inorganic acid in accordance with component (iii), and intensely dispersing the mixture.

As organoalkoxysilane of the general formula (I) it is preferred to use methyltriethoxysilane, methyltriethoxysilane, n-propyltrimethoxysilane, n-propyltriethoxysilane, vinyltriethoxysilane, vinyltrimethoxysilane, 3-methacryloyloxypropyltrimethoxysilane, 3-methacryloyloxypropyltriethoxysilane, 3-glycidyloxypropyltrimethoxysilane, 3-glycidyloxypropyltriethoxysilane, tridecafluoro-1,1,2,2-tetrahydrooctyltrimethoxysilane, tridecafluoro-1,1,2,2-tetrahydrooctyltriethoxysilane, 3-aminopropyltrimethoxysilane, N-(n-butyl)3-aminopropyltrimethoxysilane, N-(2-aminoethyl)-3-aminopropyltrimethoxysilane, N-(2-aminoethyl)-3-aminopropylmethyldimethoxysilane, bis(3-trimethoxysilylpropyl)amine, 3-mercaptopropyltrimethoxysilane or at least one organoalkoxysiloxane of the general formula (II) or a mixture of organoalkoxysiloxanes from the group consisting of aminosilanes with alkylsilanes and/or organofunctional silanes according to DE 101 51 264, 3-methacryloyloxypropyltrimethoxysilane with alkylsilanes, etc., in accordance with DE 198 34 990, alkylsilanes with alkylsilanes in accordance with EP 0 978 525 A2 or EP 0 814 110 A1, especially methyltrialkoxysilane with propyltrialkoxysilane or phenyltrialkoxysilane, and also vinylalkoxysilanes with alkylalkoxysilanes in accordance with EP 0 518 057 A1, alkoxy being preferably methoxy or ethoxy, or a mixture of organoalkoxysilanes of the general formula I and organoalkoxysiloxanes of the general formula II.

In the process of the invention it is preferred as component (ii) to use a nanoscale inorganic powder from the group consisting of silicon oxides, such as pyrogenic silica, precipitated silica, silicates, aluminum silicates, aluminum oxides, including aluminum oxide hydroxide or aluminum hydroxide, transition metal oxides, such as titanium oxide, metatitanic acid, iron oxide, zinc oxide, copper oxide, chromium oxide, or mixtures thereof, the powders in accordance with (ii) preferably having a BET surface area of between 50 and 400 $m^2/g$. By way of example, but not exclusively, it is possible in the process according to the invention to use silicon dioxide, such as Aerosil® 380 from Degussa, preferably having a BET surface area of 380 $m^2/g$, aluminum oxides such as boehmite Disperal® P3 from Sasol Germany GmbH, preferably having a BET surface area of 300 $m^2/g$, Aluminum oxide C from Degussa, preferably having a BET surface area of 100 $m^2/g$, and titanium dioxide, such as RM 300 from Sachtleben, preferably having a BET surface area of 80 $m^2/g$.

In the process of the invention components (i) to (ii) are appropriately used in a weight ratio of from 19:1 to 1:1, preferably from 10:1 to 3:2.

As component (iii) preference is given to an organic or inorganic acid, preferably hydrogen chloride, in the form for example of aqueous or concentrated hydrochloric acid, or formic acid, acetic acid, acrylic acid, maleic acid or other suitable organic acids in an amount of from 10 to 3500 ppm by weight, preferably from 100 to 1000 ppm by weight, more preferably from 200 to 400 ppm by weight, based on the amount of component (i) in the formulation.

The process of the invention is preferably conducted in a dispersing apparatus. It is preferred to use dispersing apparatus having a good shearing action. On the laboratory scale, for instance, use may suitably be made of a dissolver, for example, of the Dispermat CV or Ultra-Turrax T 25 type.

The components employed are preferably dispersed at a temperature of from 0 to 80° C., preferably from 10 to 60° C., for a period of from 10 to 60 minutes, more preferably from 15 to 40 minutes.

A dispersion or formulation obtained in this way can subsequently be aftertreated with stirring at a temperature of from 30 to 80° C. for a time of from 1 to 8 hours, preferably from 2 to 6 hours.

A formulation of the invention is appropriately adjusted by adding an organic or inorganic acid to a pH from 2 to 7, preferably from 3 to 5. In the case of the aminosilanes used in accordance with the invention the pH is generally determined by the nature of the aminosilane used and is usually situated within the alkaline range, although even here the formulation can be made neutral or acidic by addition of acid.

The present invention further provides a formulation obtainable by the process of the invention.

In accordance with the invention the present formulation, or an appropriate dilution, can be used for scratch resistance applications, for abrasion resistance applications, for corrosion protection applications, for easy-to-clean applications, for barrier applications, in the electronics segment, for the surface treatment of circuit boards, as an insulating layer, as a release layer, for the coating of the surface of solar cells, as a glass fiber size, and for the homogenous incorporation of nanoscale powders into systems of other kinds.

Such a formulation of the invention can be used with particular advantage in the production of plastics, adhesives, sealants, inks, and paints and in the synthesis of base materials for resins.

The invention accordingly further provides for the use of a formulation of the invention for synthesizing resin base materials or as a constituent in plastics, in adhesives, in sealants, in inks, and in paints, or as an ingredient in the preparation thereof.

The present invention additionally provides articles obtainable using a formulation of the invention.

Generally speaking, the process of the invention can be performed as follows:

Generally, components (i), (ii), (iii), and/or (iv) are combined with the intended amount of water and the mixture is dispersed to give a homogeneous, readily mobile formulation. It is also possible to dilute a formulation obtained in this way by adding component (v); that is, a solvent or diluent can be added to a formulation of the invention, preference being given as component (v) to alcohol, such as methanol, ethanol, isopropanol, butanol, 2-methoxypropanol, glycols, such as butylglycol, propylglycol, glycol ethers, aromatic hydrocarbons, such as xylene, toluene, esters, such as ethyl acetate, butyl acetate, and ketones, such as methyl ethyl ketone, or mixtures thereof. Surprisingly, however, it is also possible to use water as diluent, especially when a glycidyloxyalkylalkoxysilane, such as 3-glycidyloxypropyl-trimethoxysilane, is used as component (i).

It has also been found that aftertreatment of a formulation prepared by the process of the invention with an ultrasound processor, UP 200 S, for example, can lead advantageously to a further reduction in viscosity and to a further improvement in the fineness of the particles.

The present invention is illustrated by the following examples:

EXAMPLES

Example 1

30% by Weight of Aerosil® 380 in DYNASYLAN® MTES

A 250 ml stainless steel dispersing vessel with double jacket was charged with 90.0 g of methyltriethoxysilane (DYNASYLAN® MTES) and a solution of 2.7 g of deionized water and 0.05 g of concentrated hydrochloric acid was added with stirring (Dispermat CV). The liquid was stirred in the dissolver with water cooling for 5 minutes at a peripheral speed of 0.8 m/s. This was followed by the beginning of addition of 40 g of nanoscale pyrogenic silica (Aerosil® 380). When 4 to 5% by weight of Aerosil has been dispersed into the hydrolysate, there is a marked increase in viscosity. The dissolver speed was then raised gradually, during the further addition of Aerosil, to a peripheral speed of approximately 8 m/s. The incorporation time was approximately 15 minutes. Directly after all of the Aerosil® had been added, dispersing was continued for 3 minutes at a peripheral speed of 25 m/s. During the dispersing operation the temperature rose to 38° C. Subsequently the liquid thus obtained was stirred at 80° C. for a further 2 hours.

This gave a pale yellowish opalescent liquid having a viscosity of approximately 400 mPa·s, measured at 20° C. (DIN 53015). A portion of the liquid was separated off and aftertreated with the ultrasound processor UP 200S for 3 minutes, as a result of which the viscosity fell to approximately 130 mPa·s (DIN 53015).

The product was stored at 50° C. for 12 months, with the system remaining stable and no visible sedimentation being observed.

The solids content of the resulting product was found to be 40% by weight, based on the composition, in accordance with DIN/ISO 3251. Recording of a UV transmission plot (1 cm quartz glass cuvette measured against air) gave a transmission of <2% in the region from 200 to 250 nm.

Example 2

20% by Weight of Aerosil® 380 in DYNASYLAN® VTMO

A 250 ml stainless steel dispersing vessel was charged with 90.0 g of vinyltrimethoxysilane (DYNASYLAN® VTMO) and a solution of 3.3 g of deionized water and 0.05 g of concentrated hydrochloric acid was added with stirring (Dispermat CV). The liquid was stirred in the dissolver with water cooling for 5 minutes at a peripheral speed of 0.8 m/s. This was followed by the beginning of addition of 31.2 g of nanoscale pyrogenic silica (Aerosil® 380). When 4 to 5% by weight of Aerosil has been dispersed into the hydrolysate, there is a marked increase in viscosity. The dissolver speed was then raised gradually, during the further addition of Aerosil, to a peripheral speed of approximately 8 m/s. The incorporation time was approximately 20 minutes. Directly after all of the Aerosil® had been added, dispersing was continued for 3 minutes at a peripheral speed of 25 m/s. During the dispersing operation the temperature rose to 41° C. Subsequently the liquid thus obtained was stirred at 65° C. for a further 2 hours.

This gave a clear, pale yellowish liquid having a viscosity of <1000 mPa·s, measured at 20° C. (DIN 53015). The product was stored at 50° C. for 12 months, with the system remaining stable and no visible sedimentation being observed.

The solids content of the resulting product was found to be 42% by weight, based on the composition, in accordance with DIN/ISO 3251.

Example 3

30% by Weight of Aerosil® 380 in DYNASYLAN® MEMO

A 250 ml stainless steel dispersing vessel was charged with 90.0 g of 3-methacryloyloxypropyltrimethoxysilane (DYNASYLAN® MEMO) and a solution of 2.0 g of deionized water and 0.3 g of acrylic acid and 10.0 g of methanol was added with stirring (Dispermat CV). The liquid was stirred in the dissolver with water cooling for 5 minutes at a peripheral speed of 0.8 m/s. This was followed by the beginning of addition of 43.5 g of nanoscale pyrogenic silica (Aerosil® 380). When 4 to 5% by weight of Aerosil has been dispersed into the hydrolysate, there is a marked increase in viscosity. The dissolver speed was then raised gradually, during the further addition of Aerosil, to a peripheral speed of approximately 8 m/s. The incorporation time was approximately 22 minutes. Directly after all of the Aerosil® had been added, dispersing was continued for 3 minutes at a peripheral speed of 25 m/s. During the dispersing operation the temperature rose to 35° C. Subsequently the liquid thus obtained was stirred at 64° C. for a further 2 hours.

This gave a clear, colorless liquid. The product was stored at 50° C. for 3 months, with the system remaining stable and no visible sedimentation being observed.

The solids content of the resulting product was found to be 80% by weight, based on the composition, in accordance with DIN/ISO 3251.

Example 4

20% by Weight of Aerosil® 380 in DYNASYLAN® DAMO

A 250 ml stainless steel dispersing vessel was charged with 90.0 g of N-(2-amino-ethyl)-3-aminopropyltrimethoxysilane (DYNASYLAN® DAMO). With stirring (Dispermat CV) and water cooling, the addition of 23.0 g of nanoscale pyrogenic silica (Aerosil® 380) was commenced, at a peripheral speed of 0.8 m/s. When 4 to 5% by weight of Aerosil had been dispersed into the hydrolysate, there is a marked increase in viscosity. The dissolver speed was then raised gradually, during the further addition of Aerosil, to a peripheral speed of approximately 8 m/s. The incorporation time was approximately 10 minutes. Directly after all of the Aerosil® had been added, dispersing was continued for 3 minutes at a peripheral speed of 25 m/s. During the dispersing operation the temperature rose to 37° C.

This gave a clear, opalescent liquid. The product was stored at 50° C. for 12 months, with the system remaining stable and no visible sedimentation being observed.

The solids content of the resulting product was found to be 81% by weight, based on the composition, in accordance with DIN/ISO 3251.

Example 5

17% by Weight of Aluminum oxide C in DYNASYLAN® AMMO

A 250 ml stainless steel dispersing vessel was charged with 90.0 g of 3-aminopropyltrimethoxysilane (DYNASYLAN® AMMO) and with stirring (Dispermat CV) 7.2 g of deionized water were added. The liquid was stirred in the dissolver with water cooling for 5 minutes at a peripheral speed of 0.8 m/s. This was followed by beginning of the addition of 23 g of nanoscale pyrogenic aluminum oxide (Aluminum oxide C) at a peripheral speed of 0.8 m/s. When 4 to 5% by weight of aluminum oxide has been dispersed into the hydrolysate, there is a marked increase in viscosity. The dissolver speed was then raised gradually, during the further addition of aluminum oxide, to a peripheral speed of approximately 8 m/s. The incorporation time was approximately 10 minutes. Directly after all of the aluminum oxide had been added, dispersing was continued for 3 minutes at a peripheral speed of 25 m/s. During the dispersing operation the temperature rose to 34° C.

This gave a milky white, opalescent liquid having a viscosity of <10000 mPa·s, measured at 20° C. (DIN 53015). The product was stored at 50° C. for 4 months, with the system remaining stable and no visible sedimentation being observed.

Example 6

26% by Weight of Aerosil® 380 in DYNASYLAN® 1189

A 1 l stainless steel dispersing vessel was charged with 400.0 g of N-(n-butyl)-3-aminopropyltrimethoxysilane (DYNASYLAN® 1189) and 9.15 g of deionized water were added with stirring (Dispermat CV). The liquid was stirred in the dissolver with water cooling for 5 minutes at a peripheral speed of 0.8 m/s. This was followed by the beginning of addition of 127 g of nanoscale pyrogenic silica (Aerosil®) at a peripheral speed of 0.8 m/s. When 4 to 5% by weight of Aerosil has been dispersed into the hydrolysate, there is a marked increase in viscosity. The dissolver speed was then raised gradually, during the further addition of Aerosil, to a peripheral speed of approximately 8 m/s. The incorporation time was approximately 45 minutes. Directly after all of the Aerosil® had been added, dispersing was continued for 5 minutes at a peripheral speed of 25 m/s. The dispersing temperature rose to 56° C. This gave a pale yellowish, clear liquid.

Subsequently 54 g of methanol released by hydrolysis were removed by distillation from the highly filled Silan-Aerosil® formulation in a rotary evaporator at a bath temperature of 60° C. and $p_{absolute}$=1 mbar. The free methanol content (GC) in the concentrated Silane-Aerosil® formulation was <1%. The clear, pale yellowish liquid has a viscosity of 309 mPa·s of 20° C. (DIN 53015).

The produced was stored at 50° C. for 2 months, during which the system remained stable and there was no visible sedimentation.

Example 7

10% by Weight of Titanium Dioxide in DYNASYLAN® GLYMO

A 250 ml stainless steel dispersing vessel was charged with 400.0 g of 3-glycidyloxy-propyltrimethoxysilane (DYNASYLAN® GLYMO) and with stirring (Dispermat CV) 20 g of ethanol and 20 g of aqueous titanium dioxide dispersion (RM 300 WP, $TiO_2$ content 37.8% by weight, from Sachtleben) were added. The liquid was stirred in the dissolver with water cooling for 5 minutes at a peripheral speed of 1.0 m/s. Thereafter the dissolver disk was replaced by a jacketed disk of polyamide and 80 ml of zirconium oxide grinding beads of d=0.7 to 1.2 mm were introduced into the liquid. The bead mill obtained in this way was used to aftertreat the silane-$TiO_2$ formulation for 20 minutes. During the dispersing operation the temperature rose to 43° C.

This gave a milky beige opalescent liquid with an average particle size distribution $d_{50}$=80 nm (measured by means of laser diffraction).

The product was stored at 50° C. for 6 months, during which the system remained stable and there was no visible sedimentation.

Example 8

22% by Weight of Aerosil® 380 in DYNASYLAN® GLYMO

A 250 ml stainless steel dispersing vessel was charged with 60.0 g of 3-glycidyloxy-propyltrimethoxysilane (DYNASYLAN® GLYMO) and with stirring (Dispermat CV) a solution of 10.0 g of deionized water and 0.1 g of concentrated acetic acid was added. The liquid was stirred in the dissolver for 5 minutes at a peripheral speed of 0.8 m/s. This was followed by the beginning of addition of 20.0 g of nanoscale pyrogenic silica (Aerosil® 380). When from 4 to 5% by weight of Aerosil® have been dispersed into the hydrolysate there is a marked increase in viscosity. The dissolver speed was then gradually raised to a peripheral speed of approximately 8 m/s during the further addition of Aerosil®. The incorporation time was approximately 12 minutes. Directly after all of the Aerosil® had been added, dispersion was continued or 2 minutes at a peripheral speed of 25 m/s. The dispersing temperature in the uncooled vessel rose to 28° C.

This gave a clear, slightly opalescent liquid having a viscosity of <1000 mPa·s. Mixing of this silane formulation with 50% of deionized water gave an opalescent liquid of low viscosity. This product was stored at 50° C. for 1 month, during which the system remained stable and there was no visible sedimentation.

The aqueous silane formulation was used to coat an aluminum panel (3105 H24 alloy) by means of a 6 μm doctor blade, and the coating was dried at 200° C. for 15 minutes. The transparent coating exhibited good scratch resistance to steel wool.

Example 9

25% by Weight of Aerosil® R972 in DYNASYLAN® VTMO

A 500 ml stainless steel dispersing vessel was charged with 170.0 g of vinyl-trimethoxysilane (DYNASYLAN9 VTMO) and with stirring (Dispermat CV) a solution of 6.2 g of deionized water and 0.18 g of concentrated hydrochloric acid was added. The liquid was stirred in the dissolver for 5 minutes at a peripheral speed of 0.8 m/s. This was followed by beginning of addition of 50.0 g of nanoscale hydrophobicized pyrogenic silica (Aerosil® R 972). When from 4 to 5% by weight of Aerosil® has been dispersed into the hydrolysate, there is a marked increase in viscosity. The dissolver speed was then raised gradually to a peripheral speed of approximately 8 m/s during the further addition of Aerosil®. The incorporation time was approximately 21 minutes. Directly after the addition of all of the Aerosil®, dispersion was continued for 5 minutes at a peripheral speed of 25 m/s. The dispersing temperature in the uncooled vessel rose to 39° C.

This gave a pale yellowish opalescent liquid having a viscosity of 535 mPa·s.

The product was stored at 50° C. for 12 months, during which the system remained stable and no visible sedimentation was observed.

Comparative Example

8% by Weight of Aerosil® 380 in DYNASYLAN® MTES

A 250 ml stainless steel dispersing vessel was charged with 90.0 g of methyl-triethoxysilane (DYNASYLAN® MTES). This was followed directly by the incorporation of 8 g of nanoscale pyrogenic silica (Aerosil® 380). After 5 g of Aerosil® 380 had been added there was a considerable increase in viscosity. The dissolver speed was raised from 0.8 m/s to 8 m/s and a further 3 g of Aerosil® 380 were metered in. This gave a pastelike mass for which a spatula had to be used to remove it from the dispersing vessel.

What is claimed is:

1. A formulation comprising:
   (i) at least one organoalkoxysilane and/or at least one organoalkoxysiloxane solvent;
   (ii) at least one inorganic oxidic powder;
   from 0.001 to <0.8 mole of water per mole of Si in (i) and (iii), optionally, an organic or inorganic acid;

wherein
   the formulation is a liquid dispersion having a viscosity of less than 1500 mPa·s,
   a content of the at least one inorganic oxidic powder (ii) is from 5 to 50% by weight of the liquid formulation, and
   a weight ratio of the at least one organoalkoxysilane and/or at least one organoalkoxysiloxane to the at least one inorganic oxidic powder is from 19:1 to 3:2.

2. The formulation as claimed in claim 1, further comprising: a wetting assistant (iv).

3. The formulation as claimed in claim 1, further comprising a diluent or solvent (v).

4. The formulation as claimed in claim 1,
   wherein the organoalkoxysilane is of formula (I)

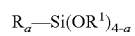  (I), wherein
   R is independently a linear, cyclic, branched or substituted alkyl group having 1 to 18 carbon atoms or an alkenyl group having 2 to 8 carbon atoms or an aryl group or an alkoxy group or an acryloyl- or methacryloyloxyalkyl group or an epoxyalkyl group or a glycidyloxyalkyl group or an aminoalkyl group or a fluoroalkyl group or a mercaptoalkyl group or a silylated alkylsulfanealkyl group or a thiocyanatoalkyl group or an isocyanatoalkyl group,
   $R^1$ is a linear, branched or cyclic alkyl group having 1 to 6 carbon atoms, and a is 1 or 2.

5. The formulation as claimed in, claim 1
   wherein the organoalkoxysiloxane is of formula (II)

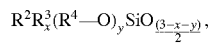  (II)

wherein
   $R^2$ is independently a linear, cyclic, branched or substituted alkyl group having 1 to 18 carbon atoms, an alkenyl group having 2 to 8 carbon atoms, an aryl group, an acryloyl- or methacryloyloxyalkyl group, a glycidyloxyalkyl group, an epoxyalkyl group, a fluoroalkyl group, an aminoalkyl group, a silylated aminoalkyl group, a ureidoalkyl group, a mercaptoalkyl group, a silylated alkylsulfane group, a thiocyanatoalkyl group, an isocyanatoalkyl group or an alkoxy group,
   $R^3$ is a linear, cyclic, branched or substituted alkyl group having 1 to 18 carbon atoms,
   $R^4$ is a linear, cyclic or branched alkyl group having 1 to 6 carbon atoms,
   x is 0 or 1 or 2, and
   y is 0 or 1 or 2,
   with the proviso that (x+y) <3.

6. The formulation as claimed in claim 1, wherein the at least one inorganic oxidic powder (ii) comprises a nanoscale powder having an average particle size ($d_{50}$) of less than 1200 nm.

7. The formulation as claimed in claim 1, wherein the at least one inorganic oxidic powder (ii) comprises a powder selected from the group consisting of silicon oxides, aluminum oxides, and transition metal oxides.

8. The formulation as claimed in claim 1, further comprising at least one reaction product of the at least one inorganic oxidic powder and the at least one organoalkoxysilane and/or at least one organoalkoxysiloxane.

9. The formulation as claimed in claim 1, wherein
a solids content is from 40 to 90% by weight, based on the total weight of the formulation.

10. A process for preparing a formulation, comprising:
combining (i) at least one organoalkoxysilane and/or at least one organoalkoxysiloxane, (ii) at least one inorganic oxidic powder, and optionally a wetting agent component (iv),
adding from 0.001 to <0.8 mole of water per mole of Si in (i) to the combination of (i), (ii) and optional (iv), optionally with a catalytic amount of an organic or inorganic acid (iii), and
intensely dispersing the mixture, wherein
the formulation comprises:
(i) the at least one organoalkoxysilane and/or the at least one organoalkoxysiloxane as a solvent;
(ii) the at least one inorganic oxidic powder;
(iii), optionally, an organic or inorganic acid,
(iv), optionally, the wetting agent,
a content of the at least one inorganic oxidic powder (ii) is from 5 to 50% by weight of the formulation,
a weight ratio of the at least one organoalkoxysilane and/or at least one organoalkoxysiloxane to the at least one inorganic oxidic powder is from 19:1 to 3:2 and
a viscosity of the formulation is less than 1500 mPa·s.

11. The process as claimed in claim 10, wherein the at least one inorganic oxidic powder (ii) comprises at least one nanoscale inorganic powder selected from the group consisting of silicas, aluminas, transition metal oxides and mixtures thereof.

12. The process as claimed in claim 10, wherein the at least one organoalkoxysilane is selected from the group consisting of methyltriethoxysilane, methyltrimethoxysilane, n-propyltrimethoxysilane, n-propyltriethoxysilane, vinyltriethoxysilane, vinyltrimethoxysilane, 3-methacryloxypropyltrimethoxysilane, 3-glycidyloxypropyltrimethoxysilane, 3-glycidyloxypropyltriethoxysilane, tridecafluoro-1,1,2,2-tetrahydrooctyltrimethoxysilane, tridecafluoro-1,1,2,2-tetrahydrooctyltriethoxysilane, 3-aminopropyltrimethoxysilane, N-(n-butyl)-3-aminopropyltrimethoxysilane, N-(2-aminoethyl)-3 -aminopropyltrimethoxysilane, N-(2-aminoethyl)-3-aminopropylmethyldimethoxysilane, bis(3-trimethoxysilylpropyl)amine, 3-mercaptopropyltrimethoxysilane and mixtures thereof.

13. The process as claimed in claim 10,
wherein the at least one organoalkoxysilane and/or at least one organoalkoxysiloxane is selected from the group consisting of at least one organoalkoxysiloxane of the general formula (ID, a mixture of organoalkoxysiloxanes of the general formula II, and a mixture of at least one organoalkoxysilane of the general formula I and organoalkoxysiloxanes of the general formula II.

14. The process as claimed in claim 10,
wherein from 0.05 to 0.5 mole of water is added per mole of Si in the (i) at least one organoalkoxysilane and/or at least one organoalkoxysiloxane.

15. The process as claimed in claim 10,
wherein
a catalytic amount of organic or inorganic acid is added,
the added organic or inorganic acid is selected from the group consisting of acetic acid, acrylic acid and maleic acid, and
an amount of the added acid is from 10 to 3500 ppm by weight based on the amount of (i) the at least one organoalkoxysilane and/or at least one organoalkoxysiloxane in the formulation.

16. The process as claimed in claim 10,
wherein a temperature for dispersing the formulation is from 0 to 80° C.

17. The process as claimed in claim 10,
wherein a time for dispersing the liquid is from 10 to 60 minutes.

18. The process as claimed in claim 10, further comprising:
aftertreating the intensely dispersed mixture,
wherein the aftertreatment comprises stirring for a period of from 1 to 8 hours at a temperature of from 30 to 80° C.

19. The process as claimed in claim 10, further comprising:
adjusting the formulation to a pH of from 2 to 7 by adding the optional organic or inorganic acid.

20. A formulation obtained by the process as claimed in claim 10.

21. A method, comprising adding to a composition or applying to a substrate the formulation as claimed in claim 1, wherein the method is for preparing a composition or forming a substrate for an application selected from the group of applications consisting of scratch resistance, abrasion resistance, corrosion protection, easy-to-clean applications, barrier applications, electronics, surface treatment of circuit boards, an insulating layer, a release layer, coating of the surface of solar cells, a glass fiber size, and homogeneous incorporation of nanoscale powders into systems of other kinds.

22. A product prepared by a method comprising utilization of the formulation as claimed in claim 1, wherein the product is a plastic, an adhesive, a sealant, a resin base material, an ink and a paint.

23. A composition, comprising the formulation as claimed in claim 1, wherein the composition is one selected from the group consisting of a resin based material, a plastic, an ink, a paint, an adhesive and a sealant.

* * * * *